United States Patent [19]
Luukkala

[11] Patent Number: 5,359,904
[45] Date of Patent: Nov. 1, 1994

[54] DEVICE AND METHOD FOR MEASURING THE TENSION STRESS OF AN OPTIC FIBER OR A CORRESPONDING WIRE

[75] Inventor: Mauri Luukkala, Espoo, Finland
[73] Assignee: Soundek Oy, Finland
[21] Appl. No.: 1,315
[22] Filed: Jan. 6, 1993

[30] Foreign Application Priority Data

Jan. 9, 1992 [FI] Finland .................................. 920083

[51] Int. Cl.⁵ .............................................. G01L 1/00
[52] U.S. Cl. .............................. 73/862.391; 356/73.1
[58] Field of Search ...................... 73/862.41, 862.391; 356/73.1, 32, 33, 34, 35, 35.5

[56] References Cited

U.S. PATENT DOCUMENTS

| | | | |
|---|---|---|---|
| 3,854,329 | 12/1974 | Jones | 73/862.41 |
| 4,692,615 | 9/1987 | Mensah et al. | 356/73.1 |
| 4,833,928 | 5/1989 | Luukkala et al. | 73/862.391 |
| 5,079,433 | 10/1990 | Smith | 356/73.1 |
| 5,228,893 | 7/1993 | Smithgall et al. | 73/862.41 |
| 5,233,200 | 8/1993 | DiMarcello et al. | 356/73.1 |

Primary Examiner—Leslie Pascal
Assistant Examiner—R. Biegel
Attorney, Agent, or Firm—Steinberg, Raskin & Davidson

[57] ABSTRACT

The invention relates to an on-line tension meter for an optic fiber. The tensile stress of a bare optic fiber is measured without contacting the optic fiber as the optic fiber is drawn in a draw machine. A loudspeaker causes a wire wave to be formed in the fiber. The fiber tension is then measured by the advancing speed of the wire wave. The speed is measured by means of two location-sensitive electro-optic indicators or cameras, the distance therebetween being known.

16 Claims, 2 Drawing Sheets ly. A loudspeaker is brought near the membrane, by means of which a mechanical surge is brought about onto the membrane. The mechanical surge advances in the direction of the membrane tension. The advancing speed of the surge is measured by optically measuring the vibration of the membrane at two different points on the membrane. When the wave speed and the basis weight of the membrane are known, the tension may be calculated. However, such a method cannot be used for measuring the tensile stress of a thin transparent glass-fiber. The reason for this is because the two physical wave movements are described by two different equations, since the phenomena are different phenomena, i.e. the wave movement of a thin wire is physically different as compared to the wave movement of a planar membrane.

DEVICE AND METHOD FOR MEASURING THE TENSION STRESS OF AN OPTIC FIBER OR A CORRESPONDING WIRE

BACKGROUND OF THE INVENTION

The invention relates to a measuring device for measuring the tensile stress of an optic fiber or a corresponding wire. The invention also relates to a method for measuring the tensile stress of an optic fiber or corresponding wire.

An optic fiber is a thin glass fiber whose diameter is about 150 micrometers. Optic fibers are used to replace copper conductors in telecommunications paraphernalia, since the data transmission capacity of optic fibers are much higher than that of copper conductors. Furthermore, there is no shortage of the raw material of the optic fiber, i.e. glass, as is the case with copper.

Optic fiber is prepared in a so-called draw tower, which is a large-sized tower with a height of about 6 m to about 7 m. At the upper end of the tower, molten glass is drawn downwards into a thin fiber. The hot fiber cools as it progresses downwards through the tower. At the lower end of the tower, the fiber may be coated with a desired polymer in a special coating vat. After the coating step, the fiber passes over a tension meter and is transported onto a special roller. The fiber is wound into a roll on the roller.

It is known that bare optic fiber, i.e. an uncoated optic fiber, cannot bend since it breaks apart. However, after the fiber is coated by the polymer coating, the fiber is very resistant to bending.

In conventional draw towers, the draw rate is generally about 2 m/s to about 4 m/s. The draw rate of the fiber and the thickness of the fiber are adjusted with by means of the tension meter. It is not possible to measure the tension stress of the fiber before the fiber is coated since a bare fiber cannot be contacted. However, a possible tension measurement taken after the fiber is coated is not useful as it would provide an incorrect result of the tension of the bare, uncoated fiber.

As known in the art, it is desirable to increase the draw rate of the fiber in the draw tower. It is preferable from the point of view of the process control that the tension of the fiber should be measured without contacting the fiber. A current fiber tension meter used in draw towers is a spring-loaded roller over which an uncoated optic fiber advances. The rate of the loading of the roller indicates the fiber tension of the optic fiber. However, such a roller that contacts the bare, uncoated fiber easily breaks the bare fiber and is only used at very slow draw speeds when the drawing machine starts operation.

With respect to the prior art, an electro-optic meter may be mentioned as one device to measure tensile stress. In this type of instrument the tensile stress of the fiber is measured on the basis of the double refraction of light. The glass-fiber material in the meter is often quartz in which a double refraction of light occurs which is comparative to the tension in the fiber. A problem associated with this type of meter is the fact that the light has to be accurately focused on a movable glass-fiber of a strength of about 150 micrometers. After the light is focused, the double refraction is measured.

In Finnish Patent No. FI 79410 and U.S. Pat. No. 4,833,928, a method is described in which the tension of a movable thin film or membrane is measured by measuring the speed of the membrane wave acousto-optically.

In U.S. Pat. No. 5,079,433, a device is described which measures the tension of a fiber by causing a standing wave movement by means of pressurized air and then measuring the basic frequency of the standing wave. On the basis of these measurements, the fiber tension is calculated. In the device described in that patent, very complex calculative arrangements have to be performed, such as doubling the frequency etc., in order to calculate the fiber tension. The standing wave movement and its frequencies also depend on the fiber length to be measured or the fixing points of the fiber. These measurements are determined by the dimensions of the drawing machine used. This results in a significant disadvantage if the fiber length or fixing points of the fiber are unknown or indeterminable.

In European Patent publication EP 0 226 393, a measuring method is described wherein the fiber tension is measured by electro-optical means without contacting the optic fiber. The vibration frequency of the fiber is indicated by a so-called CCD-camera whereby a fiber shadow is caused to fall onto a surface of the CCD-camera. Also in this measuring method, a standing wave is produced along the entire fiber length, and a so-called basic frequency is searched for by means of the Fourier analysis. From these measurements, the speed of the wave movement, and thereafter the fiber tension, is calculated.

OBJECTS AND SUMMARY OF THE INVENTION

It is an object of the present invention to provide an improvement over the currently known measuring devices for measuring the tensile stress of an optic fiber or a corresponding wire.

It is another object of the present invention to overcome the disadvantages of prior art tensile stress measuring methods.

It is a further object of the present invention to measure the tensile stress of an optic fiber without contacting the fiber such that the measurement compensates for the advancing speed of the fiber.

In view of achieving the above objects and others, the present invention is related to a measuring device provided with means for producing a vibration surge vibrating at a certain preselected frequency into an optic fiber. The surge advances as a linearly polarized wire wave through the optic fiber. A linearly polarized wave is a wave which vibrates in a direction transverse to the direction of propagation of the wave. The device further comprises at least two location-sensitive indicators for measuring the advancing speed (v) of the wire wave provided in the optic fiber. The indicators are successively arranged at a known distance apart along a length of the optic fiber. After measuring the speed (v) of the wire wave, the tensile stress (T) of the optic fiber is calculated from the equation $T=v^2 \cdot M$, when (M) is the fiber mass per length unit of the optic fiber.

In a preferred embodiment, the indicators may be optic location-sensitive indicators or analog location-sensitive indicators. The device may also comprise an illuminator for illuminating the optic fiber such that a shadow or a view of the vibrating optic fiber is cast onto the indicators. The advancing speed (v) of the wire wave is obtained on the basis of the time difference of electronic signals measured by the indicators. In addition, a computing device, such as a computer, may be connected to the indicators in certain embodiments for calculating the tensile stress (T) of the optic fiber.

In yet another preferred embodiment, the indicators comprise two pairs of successive optic location-sensitive indicators for measuring the speed of the wire wave both in the direction of the drawing speed of the fiber and in the opposite direction thereto. In this manner, the effect of the inherent drawing speed of the optic fiber on the measurement of tensile stress of the optic fiber is eliminated by calculating the average of the speeds thus obtained and using the average to compute the tensile stress. For this purpose, a computing device is preferably provided for receiving the measured speeds of the wire wave and compensating for and eliminating the effect of the inherent drawing speed of the optic fiber on the measurement of the tensile stress of the optic fiber. Furthermore, the indicators may be location-sensitive linear cameras which emit a signal corresponding to the location of the shadow of the fiber cast onto the cameras.

By means of the measuring device of the present invention, several important advantages are obtained in comparison with the measuring devices known in the prior art. The acousto-optic measuring device in accordance with the present invention measures the fiber tensile stress by means of wire waves, when the fiber mass per length unit is known. Thus, the tensile stress of the fiber may be measured without contacting the fiber such that the measurement compensates for the advancing speed of the fiber. Owing to this, the device of the present invention enables an increase in the fiber draw speed to a maximum of about 10 m/s to about 20 m/s, or even higher, since the drawing speed may be measured reliably and with sufficient precision.

The present invention is also related to a method for measuring the tensile stress of the optic fiber or other corresponding wire between the formation of the fiber in a draw tower and the coating of the optic fiber in a coating vat. In this method, a vibration surge is produce which vibrates at a preselected frequency and is directed into an optic fiber such that the vibration surge advances as a linearly polarized wire wave. At least two successive location-sensitive indicators are arranged along a length of the optic fiber. The advancing speed (v) of the wire wave is measured via the indicators. Thereafter, the tensile stress (T) of the optic fiber is calculated as a function of the advancing speed of the wire wave and the fiber mass per unit of length (M) of the optic fiber from the equation $T=v^2 \cdot M$.

In other embodiments of the method of the present invention, the optic fiber is illuminated such that a shadow or a view of the vibrating optic fiber is cast onto the indicators. The advancing speed of the wire wave is obtained on the basis of the time difference of electronic signals measured by the indicators. A loudspeaker may be arranged parallel to the optic fiber for producing the vibration surge such that a narrow gap is located between the loudspeaker and the optic fiber.

In a preferred embodiment of the method in accordance with the present invention, the speed of the wire wave is measured both in the direction of the drawing speed of the fiber and in the opposite direction thereto by means of two pairs of successive optic location-sensitive indicators. The average of the speeds thus obtained is calculated and used to obtain the tensile stress in order to eliminate the effect of the inherent drawing speed of the optic fiber on the measurement of the tensile stress.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

An important principle of the measuring device and method in accordance with the invention is that an advancing vibration surge is produced into the fiber. The advancing speed (v) of the vibration surge is measured by various measuring means. When the mass of the fiber per length unit is known, the fiber tensile stress (T) is obtained by calculation from the formula (1)

$$T=v^2 \cdot M \tag{1}$$

wherein (M) equals the fiber mass per length unit of the optic fiber. Thus, in the measuring device of the present invention, a suitable advancing acoustic surge is first produced into a bare fiber, whose advancing speed (v) is measured in a certain manner without contacting the fiber.

As the fiber is drawn downwards in the draw tower, the fiber is bare within a distance of several meters before the fiber advances into the coating vat. In this area before the fiber is coated, a loudspeaker, preferably an enclosed loudspeaker, may be installed such that there is a narrow gap in the front wall of the enclosure. From this gap, a sound wave surge produced by the loudspeaker may be discharged. The gap is preferably parallel with the fiber such that the fiber enters into a linearly polarized vibration due to the surge. This vibration is similar to that of a guitar string when it is plucked.

The preferred vibration frequency of the surge for tension measurement purposes is, in practice, about 300 Hz. However, this frequency is not a critical value of the invention and other frequencies may be used. The advancing speed of the vibration in the fiber is measured optically at least at two different points, the distance therebetween being known.

Figure 1:
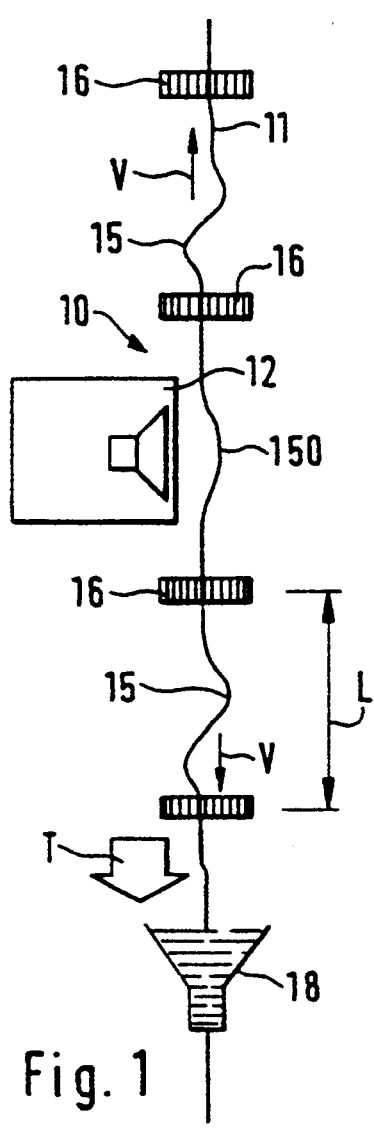
FIG. 1 shows a schematic view seen from the side of a measuring device in accordance with the invention used in a method in accordance with the present invention.
Figure 2:
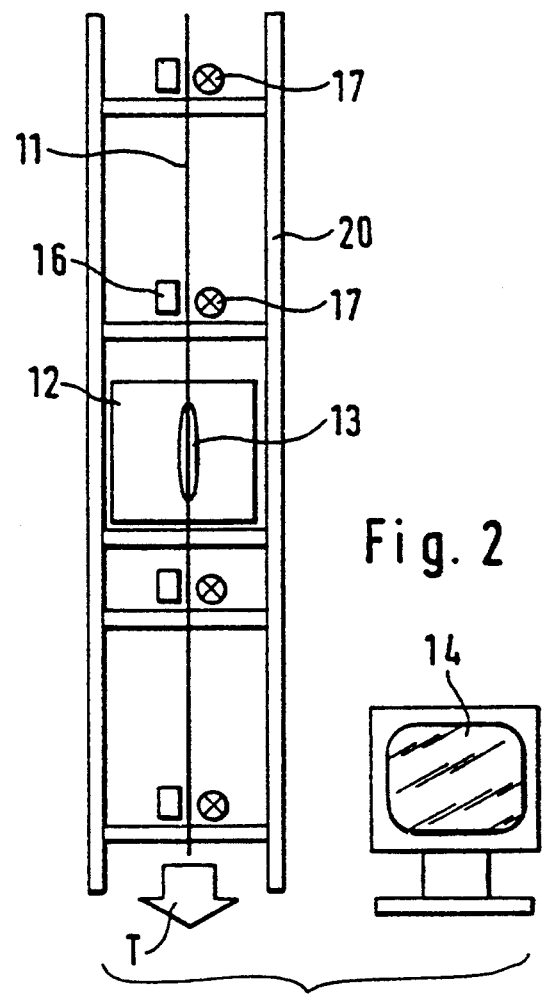
FIG. 2 shows a front view of the measuring device in accordance with the invention as illustrated in FIG. 1.
Figure 3:
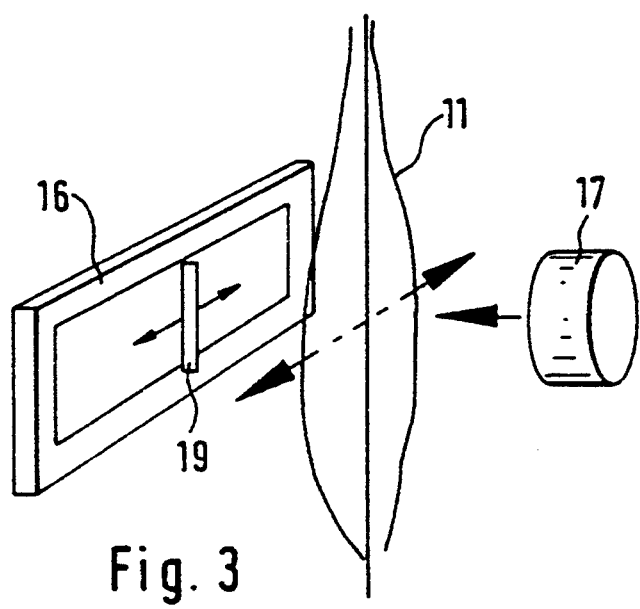
FIG. 3 shows an axonometric view of the vibration of an optic fiber in front of a location-sensitive electro-optic indicator used in a device and method in accordance with the invention.

In the embodiments of the present invention illustrated in FIGS. 1-3, the measuring device is generally indicated by reference number 10. An optic fiber 11 is placed under tension and caused to enter into a linearly polarized vibration movement by means of an acoustic surge. The acoustic surge is produced by a suitable device, such a loudspeaker 12, preferably an enclosed loudspeaker. A narrow gap 13 is arranged in the direction of the fiber 11 in front of the loudspeaker 12. An electronic surge signal is directed to the loudspeaker 12 and is modified into the acoustic surge. The surge signal is controlled e.g. by means of a computer 14 at a frequency of about 300 Hz. A bend 15 is produced in the fiber 11 and starts to advance along the fiber in both directions as a wire wave 15. The wire wave 15 advances at a speed which is a function of the tension in the fiber, e.g. the faster the wire wave advances, the higher the tension in the fiber 11.

The speed of the wire wave 15 is measured by means of at least two optic location-sensitive indicators 16, or other measuring means, the distance L therebetween being known. The indicators 16 measure the location of a shadow 19 of the illuminated fiber 11 and its vibrations. The illumination of the fiber 11 occurs by means of an illuminator 17, which may be e.g. a LED-lamp. The illumination of the fiber 11 causes a shadow 19 to fall onto the surface of the indicator 16, such as a camera. The location of the shadow 19 may then be measured in a real-time by means of the computer 14 connected to the camera 16.

The location-sensitive indicator 16 is a so-called line-like semiconductor indicator in which the location of the shadow 19 may be measured by measuring the voltage produced by the indicator 16. The indicator 16 may also be a location-sensitive linear camera that emits a signal which corresponds to the location of the shadow 19 of the fiber 11 in front of the camera 16.

When the fiber 11 vibrates, its shadow 19 also naturally vibrates. Thus, in the present invention, it is possible to measure the vibration of the shadow of the fiber, and hence the vibration of the fiber, with two indicators 16 located at a known distance L from each other. The speed (v) of the wave movement may then be measured and the tensile stress calculated.

As illustrated in FIG. 2, the inventive equipment may preferably be located in a frame 20. The indicators 16 are thus arranged along the length of the wire between the molten glass and the coating vat 18.

FIG. 3 shows the transverse vibration of the fiber 11 in front of the camera in an illustrative manner. It is important feature that the loudspeaker 12 causes the fiber 11 to vibrate as a so-called linearly polarized vibration. This means that the fiber vibrates on its own level, and not e.g. on a circularly polarized level. In this manner, the optic measurement of the diameter of the fiber 11 is not disturbed since the vibration occurs in the direction of the measurement.

When the wire wave 15 advances along the fiber 11, the wire wave 15 contacts the upper and lower end of the fiber 11 and is reflected back from these points causing additional waves to be imparted to the fiber 11. These additional waves may also be observed by the cameras 16 as additional signals. However, in the draw tower of the fiber 11, the lower end of the fiber enters a coating vat 18 wherein molten plastic efficiently dampens the vibrations. On the upper end of the draw tower, molten glass, from which the optic fiber will be formed, is present and also efficiently dampens the vibrations. In this manner, the reflections of the upper and lower end are considerably dampened, and substantial disturbances of the tensile stress measurement of the optic fiber is prevented.

It is another important feature that a stagnant wave is not caused to enter into the fiber 11. Rather, an advancing wave movement, whose advancing speed v is relatively easy to measure enters the optic fiber. The advancing speed v is measured from the time difference of the vibrations by means of two successive locations-sensitive cameras 16 and the known distance L therebetween.

FIG. 3 illustrates an embodiment of the device in accordance with the invention in which the fiber 11 vibrating in front of the camera 16 is illuminated, e.g. by means of a LED-lamp 17. By illuminating the fiber, the movement of the shadow 19 of the fiber focusing on the camera 16 may be electronically monitored. The electronic signal provided by the camera 16 is transmitted to a computer 14 which analyzes the signal such that the speed v of the wave movement may be calculated from formula (1) by means of conventional algorithms of the computer 14.

In conventional draw towers, the drawing speed of the optic fiber is generally in the range of about 2 m/s to about 4 m/s. The speed of the wire wave 15 in the drawing process is about 100 m/s in connection with regular draw tensions used in conventional draw towers. In the calculations of measurement accuracy, this means an error of about 2% to about 4% due to the inherent movement of the fiber 11. However, the measurement accuracy is actually in the range of about 4% to about 5% due to other factors. For this reason, the inherent speed of the fiber 11 is just within the limits of the measurement accuracy, and it is therefore not very detrimental to the tensile stress measurement.

In a preferred embodiment of the present invention, the inherent speed of the fiber 11 may be compensated for, if desired, by means of two pairs of cameras 16, one of which is located "upstream" and the other one "downstream" relative to the loudspeaker 12. The speed compensation is of substantial importance since the drawing speed of the fiber is increased by about 10 m/s to about 20 m/s, or even higher, by means of the device and method of the present invention.

When the wire wave 15 starts to advance, one wire wave 15 advances downstream along with the speed of the fiber and the other wire wave advances upstream relative to the movement of the fiber 11. The inherent movement of the fiber 11 thus produces an error for both wire wave 15 which are of an opposite sign, i.e. one upstream and the other downstream. This inherent movement of the fiber may be eliminated by calculating the average of the speeds of both wire waves 15 by means of the computer 14 connected to the cameras 16.

The effect of the error of the inherent speed of the fiber 11 may also be eliminated by appropriate calculations. For example, in the situation where the speed of the fiber 11 is otherwise known, the speed value can be entered into the computer 14 which takes into account its effect on the tension value. For calculating the tension, the mass of the fiber 11 per length unit has to be known and may be calculated by optically measuring the diameter of the fiber 11 when the total density of the fiber material is known.

Most fiber draw towers include an optic fiber-diameter meter which often also uses a so-called CCD-camera. Since the vibration of the fiber 11 is linearly polarized, the polarization of the vibration may be arranged such that it does not disturb the diameter measurement of the fiber 11.

The vibration of the fiber 11 may also be detrimental to the drawing and coating of the fiber 11 itself such that it causes the fiber to be non-uniform. However, the amplitude of the vibration is in practice in the range of the diameter of the fiber 11. The vibration of the fiber are very rapidly dampened in the polymer coating vat 18 and in the molten glass of the upper end of the draw tower. As a result, the detrimental effect of the vibration of the fiber 11 is in fact very minimal.

Figure 4:
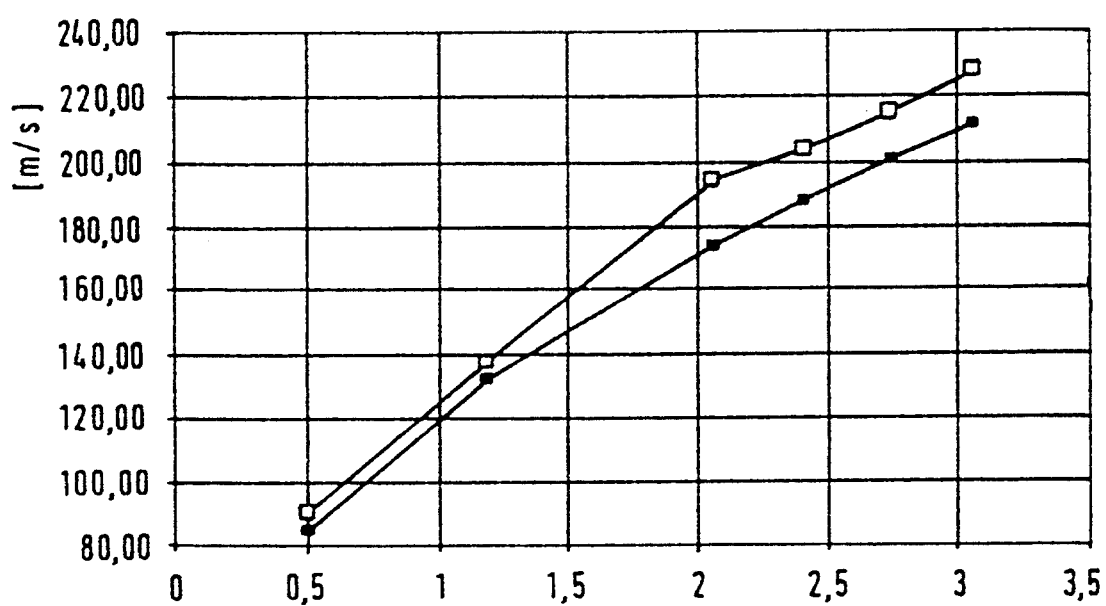
FIG. 4 shows a graphic representation of measured advancing speeds of a wire wave for an optic fiber as a function of the tensile stress T.

FIG. 4 shows measurement results, on the basis of which, it may be estimated that the speed of the wire wave 15 advancing in the fiber 11 is about 80 m/s to about 140 m/s at typical draw tensions.

In a preferred embodiment of the present invention, the distance L of the indicators 16 from each other is about 0.50 cm. Thus, the tension is measured along a relatively short distance for which it can be assumed that the tension is constant. A considerable temperature gradient occurs in the drawing situation along the entire length of the fiber 11. The temperature gradient causes the tension to vary along the length of the fiber 11. For this reason, a prior-art stagnant-wave tension meter measuring along the entire length of the optic fiber cannot provide a reliable result of the tension in the optic fiber.

The examples provided above are not meant to be exclusive. Many other variations of the present invention would be obvious to those skilled in the art, and are contemplated to be within the scope of the appended claims.

What is claimed is:

1. A measuring device for measuring tension of an optic fiber, comprising
   means for producing a traveling wave and directing the wave into an optic fiber such that the wave advances along the optic fiber as a linearly polarized wave, and
   at least two location-sensitive indicators for measuring the advancing velocity (v) of the wave provided in the optic fiber, said indicators being successively arranged at a known distance apart along a length of the optic fiber, whereby the tension (T) of the optic fiber is calculated from the equation $T=v^2 \cdot M$, when (M) is the fiber mass per length unit of the optic fiber.

2. The measuring device of claim 1, wherein said indicators measure the advancing velocity optically.

3. The measuring device of claim 1, further comprising an illuminator for illuminating the optic fiber such that a shadow or a view of the vibrating optic fiber is cast onto said indicators, whereby the advancing velocity (v) of the wave is obtained on the basis of the time difference of electronic signals measured by said indicators.

4. The measuring device of claim 3, further comprising a computing device for calculating the tension (T) of the optic fiber, said indicators being connected to said computing device.

5. The measuring device of claim 4, wherein said computing device is a computer.

6. The measuring device of claim 1, wherein said indicators are analog location-sensitive indicators.

7. The measuring device of claim 1, wherein said means for producing a traveling wave comprise a loudspeaker arranged parallel to the optic fiber such that a narrow gap is located between said loudspeaker and the optic fiber.

8. The measuring device of claim 1, wherein said indicators comprise two pair of successive optic location-sensitive indicators for measuring the velocity of the wire wave both in the direction of the drawing speed of the fiber and in the opposite direction thereto.

9. The measuring device of claim 8, further comprising a computing device for receiving the measured velocities of the wave from said two pair of indicators, said computing device calculating the tension of the optic fiber by using the average of the velocities obtained.

10. The measuring device of claim 1, further comprising a frame, said for producing a traveling wave means and said indicators being positioned on said frame.

11. The measuring device of claim 3, wherein said indicators are location-sensitive linear cameras which emit a signal corresponding to the location of the shadow of the fiber cast onto said cameras.

12. A method for measuring tension of an optic fiber, comprising the steps of:
   forming an optic fiber in a draw tower,
   producing a traveling wave and directing the wave into the optic fiber such that the wave advances along the optic fiber as a linearly polarized wave,
   arranging at least two successive location-sensitive indicators along a length of the optic fiber,
   measuring the advancing velocity (v) of the wave via the indicators, and
   calculating the tension (T) of the optic fiber as a function of the advancing velocity of the wave and the fiber mass per unit of length (M) of the optic fiber from the equation $T=v^2 \cdot M$.

13. The method of claim 12, further comprising the step of illuminating the optic fiber such that a shadow of the vibrating optic fiber is cast onto the indicators, whereby the advancing velocity of the wave is obtained based on the time difference of electronic signals measured by the indicators.

14. The method of claim 12, further comprising the step of arranging a loudspeaker parallel to the optic fiber for producing traveling wave such that a narrow gap is located between the loudspeaker and the optic fiber.

15. The method of claim 12, further comprising the steps of:
   measuring the velocity of the wave both in the direction of the drawing speed of the fiber and in the opposite direction thereto by means of two pairs of successive optic location-sensitive indicators,
   calculating the average of the velocities thus obtained, and
   using the average velocity to obtain the tension in order to eliminate the effect of the inherent drawing speed of the optic fiber on the measurement of the tension.

16. The method of claim 12, further comprising forming the optic fiber in a draw tower, and coating the optic fiber after the tension of the optic fiber is calculated.

* * * * *